United States Patent [19]

Miyajima et al.

[11] Patent Number: 4,843,600
[45] Date of Patent: Jun. 27, 1989

[54] RECORDING HEAD FOR MAGNETO-OPTICAL INFORMATION RECORDING APPARATUS

[75] Inventors: Yoshikazu Miyajima, Kawasaki; Makoto Shiho, Yokohama, both of Japan

[73] Assignee: Canon Kabushiki Kaisha, Tokyo, Japan

[21] Appl. No.: 904,453

[22] Filed: Sep. 8, 1986

[51] Int. Cl.$^4$ .................. G11B 11/14; G11B 13/04
[52] U.S. Cl. .................................... 369/13; 360/114; 360/59; 365/122
[58] Field of Search ............... 369/13; 360/114, 59; 365/122

[56] References Cited

U.S. PATENT DOCUMENTS 4,340,914  7/1982  Hanaoka ........................ 360/59

FOREIGN PATENT DOCUMENTS

| 0115666 | 6/1984 | European Pat. Off. | |
|---|---|---|---|
| 54-146612 | 11/1979 | Japan | 369/44 |
| 57-15203 | 1/1982 | Japan . | |
| 57-94906 | 6/1982 | Japan | 369/13 |
| 57-179907 | 11/1982 | Japan | 369/13 |
| 59-148159 | 8/1984 | Japan | 360/114 |
| 59-172175 | 9/1984 | Japan | 369/13 |
| 60-29904 | 5/1985 | Japan . | |
| 60-214438 | 10/1985 | Japan | 360/114 |
| 60-214439 | 10/1985 | Japan | 360/114 |
| 61-32244 | 11/1986 | Japan . | |

Primary Examiner—Aristotelis M. Psitos
Assistant Examiner—Hoa T. Nguyen
Attorney, Agent, or Firm—Fitzpatrick, Cella Harper & Scinto

[57] ABSTRACT

A magneto-optical information recording apparatus comprises an objective for condensing a light beam on a magneto-optical recording medium, a bias magnetic field producing device provided on the opposite side of the objective with respect to the magneto-optical recording medium and applying a magnetic field from outside to the magneto-optical recording medium near the condensed point of the light beam, and a protective outer frame containing the objective therein and having an opening for transmitting the light beam therethrough at a location opposed to the magneto-optical recording medium, at least a portion of the protective outer frame being formed of a ferromagnetic material.

11 Claims, 4 Drawing Sheets

RECORDING HEAD FOR MAGNETO-OPTICAL INFORMATION RECORDING APPARATUS

BACKGROUND OF THE INVENTION

1. Field of the Invention

This invention relates to a magneto-optical information recording apparatus, and more particularly to a magneto-optical information recording apparatus which can produce a magnetic field on the surface of a disk-like magneto-optical recording medium in a predetermined direction and can record, reproduce or erase information with non-contact by application of a light beam.

2. Related Background Art

Magneto-optical disk apparatuses using, for example, disk-like recording media are known as magneto-optical information recording apparatuses.

As the magneto-optical recording medium used in such apparatuses, use is made of a medium in which a vertically magnetized film is formed on the surface of a disk and the directions of magnetization of the vertically magnetized film are arranged in a predetermined direction.

Recording of information is accomplished in such a manner that a laser-modulated laser beam is applied to the vertically magnetized film and the temperature of the vertically magnetized film exceeds the curie point (160°). The portion to which the laser beam has been applied at this time is made opposite in direction of magnetization to the surroundings thereof by a DC bias magnetic field, and is again magnetized. In this manner, a pit row comprising a magnetization-inverted portion is formed in conformity with an information signal.

Also, to read the information recorded on a magneto-optical disk, there is a reading method utilizing the so-called magnetic Kerr effect which comprises applying a reading laser beam to the vertically magnetized film and changing the direction of the reflected beam by the difference in the direction of magnetization of the vertically magnetized film.

To erase the recording pits, a laser beam is applied to the recording pit portion while tracking on the recording pits, and a DC bias magnetic field in the direction of magnetization opposite to that of the recording pits is applied, and the directions of magnetization of the vertically magnetized film are again made uniform.

Here, it is to be understood that the DC bias magnetic field is changed over in direction of magnetization during the recording and during the erasing.

As a method of producing a DC bias magnetic field, there is generally a method using a permanent magnet or a method using an electromagnet.

However, according to the former method using a permanent magnet, it takes much time to invert the magnetization and also, a mechanism for inverting the magnetization is required, and this leads to an increased number of parts and thus, an increased cost. For this reason, the latter method using an electromagnet has heretofore been adopted as the method of producing a DC bias magnetic field.

Figure 1:
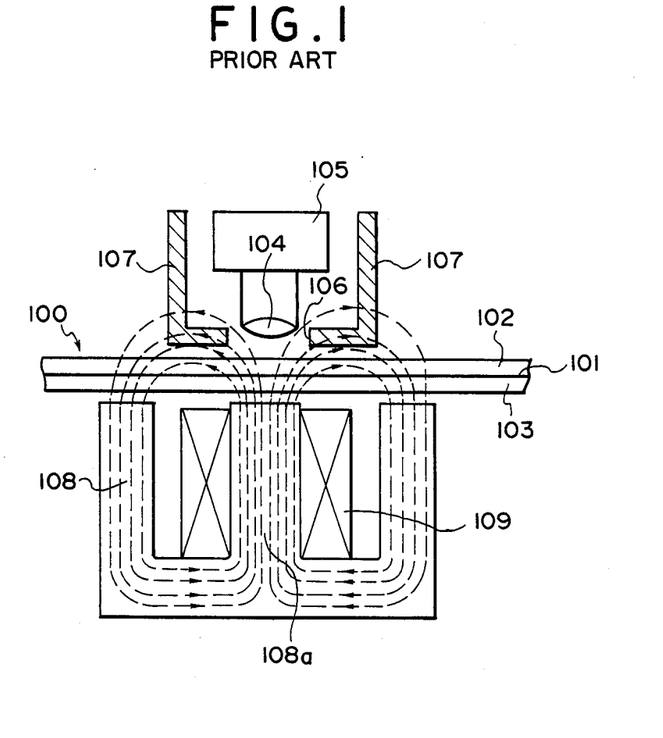
FIG. 1 is a side cross-sectional view schematically showing the construction of a magneto-optical information recording apparatus according to the prior art.

FIG. 1 of the accompanying drawings is a side cross-sectional view schematically showing the construction of a magneto-optical disk apparatus according to the prior art for recording information on a magneto-optical disk.

In FIG. 1, reference numeral 100 designates an optical disk. A plurality of row-like tracks comprising concavo-convexities are formed on the optical disk 100. A substrate 102 is provided on the upper surface of a vertically magnetized film 101 and a lining plate 103 is provided on the underside of the vertically magnetized film 101, whereby the optical disk 100 is constituted.

TbFe or TbFeCo is known as the material forming the vertically magnetized film 101, and glass or plastics is known as the material forming the lining plate 103.

An objective 104 is disposed for movement in the radial direction of the optical disk 100 with an optical head, and is finely driven in the direction of the optic axis and the radial direction of the disk by objective driving means 105 provided in the optical head, whereby focusing or tracking control is accomplished.

The objective driving means 105 is a device which drives the objective 104 by an electromagnetic force. Although not shown, this objective driving means comprises, for example, a coil and a magnet producing a magnetic field across the coil, and one of these is fixed to the objective and the other is fixed to the optical head body, and the objective driving means 105 moves the objective 104 by a drive force produced by flowing an electric current to the coil.

The objective driving means 105 and the objective 104 are contained in a protective outer frame 107 provided with a light-passing opening 106 at the bottom thereof. The protective outer frame 107 is usually formed of plastics or the like and prevents extraneous dust or the like from adhering to the surface of the lens.

A yoke 108 comprises, for example, an E-shaped magnetic member, and forms a bias magnet by an electric current flowing in a coil 109 wound on the protruding portion 108a of the yoke 108. By this bias magnet, an upward magnetic field is applied to the vertically magnetized film 101. The magnetic line of force having left the central protruding portion of the yoke enters the opposite protruding portions of the yoke via the routes as indicated by broken lines in FIG. 1. Accordingly, the magnetic flux density distribution in the vertically magnetized film 101 widens in the direction of the film surface and part of the magnetic flux provides a leakage flux which does not contribute to recording. In such a construction, to obtain the intensity of magnetic field necessary for recording, it becomes necessary for a great electric current to flow in the coil 109 or to increase the number of turns of the coil 109.

However, if a great electric current flows in the coil, a bulky power source of great capacity will become necessary and temperature rise will also become large. Also, where the number of turns of the coil is increased, the bias magnetic will unavoidably become bulky and the reactance of the coil will increase with the increase in the number of turns and, in such case, much time will be required for recording, erasing or converse changeover.

SUMMARY OF THE INVENTION

It is an object of the present invention to provide a magneto-optical information recording apparatus which can efficiently apply a magnetic field to a magneto-optical recording medium.

The above object of the present invention is achieved by a magneto-optical information recording apparatus comprising an objective for condensing a light beam on a magneto-optical recording medium, bias magnetic field producing means provided on the opposite side of said objective with respect to said magneto-optical recording medium and applying a magnetic field from outside to said magneto-optical recording medium near the condensed point of said light beam, and a protective outer frame containing said objective therein and having an opening for transmitting said light beam therethrough at a location opposed to said magneto-optical recording medium, at least a portion of said protective outer frame being formed of a ferromagnetic material. That is, in the present invention, a ferromagnetic material is provided in the protective outer frame of the objective provided in opposed relationship with the bias magnetic field producing means, whereby a magnetic line of force is concentrated in the recording portion and a bias magnetic field of sufficient intensity is obtained without the bias magnetic field producing means being made bulky and high in output.

DESCRIPTION OF THE PREFERRED EMBODIMENTS

Some embodiments of the present invention will hereinafter be described in detail with reference to the drawings.

Figure 2:
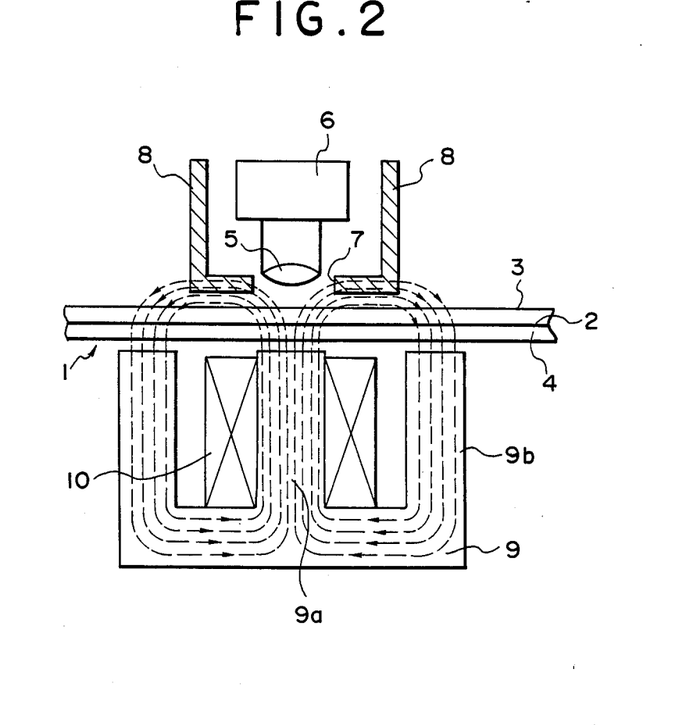
FIG. 2 is a side cross-sectional view schematically showing the construction of an embodiment of the magneto-optical information recording apparatus of the present invention.

FIG. 2 is a side cross-sectional view schematically showing the construction of an embodiment of the magneto-optical information recording apparatus of the present invention as seen from the radial direction of a disk. In FIG. 2, reference numeral 1 designates an optical disk. A plurality of row-like tracks comprising concavo-concavities are formed on the optical disk 1.

The optical disk 1 is constituted by providing a wafer-like substrate 3 on the upper surface of a vertically magnetized film 2 and lining plate 4 on the underside of the vertically magnetized film 2.

As the vertically magnetized film 2, use may be made of non-crystalline magnetic alloy such as GdTbFe or TbFeCo made by sputtering or evaporation, or a two-layer film comprising a cobalt-chromium alloy thin film and a Permalloy in-surface magnetized film. The lining plate 4 may be formed of a material such as glass or plastics.

An objective 5 is supported for movement in the radial direction of the optical disk 1 and may be finely driven in the direction of the optic axis and the radial direction of the disk by objective driving means 6 provided in an optical head, whereby focusing or tracking control may be accomplished. The objective driving means 6, like the objective driving means 105 according to the prior art, is comprised, for example, of a coil and a magnet, and drives the objective 5 by an electromagnetic force.

The objective lens driving means 6 and the objective 5 are contained in a protective outer frame 8 provided with an opening 7 in the bottom thereof, namely, at a location opposed to the optical disk 1, said opening 7 transmitting a light beam therethrough, whereby they are protected against the invasion of dust or the like from outside. The protective outer frame 8 is made as by press-working a sheet member consisting of ferromagnetic material such as electromagnetic soft iron, Bonde steel sheet, silicon steel sheet or magnetic steel sheet.

A yoke 9 comprises, for example, an E-shaped magnetic member provided with a gap at a location opposed to the optical disk 1, and forms a bias magnet by an electric current being flowed to a coil 10 wound on the protruding central portion 9a and outer peripheral portion 9b of the yoke 9. An upward magnetic field is applied to the vertically magnetized film 2 by the bias magnet. When an electric current flows in the coil 10, the magnetic line of force produced flows from the protruding central portion 9a of the yoke 9 to the outer peripheral portion 9b of the yoke 9 through the protective outer frame 8 disposed on the optical disk 1, as indicated by broken lines in FIG. 2, because the protective outer frame 8 consists of a ferromagnetic material. Accordingly, the magnetic flux concentrates on a recording portion substantially just above the protruding central portion 9a (a portion to which the light beam is applied, and the leakage magnetic field can be reduced. Accordingly, the situation encountered in the magneto-optical information recording apparatus according to the prior art, in which the magnetic field must be intensified to overcome leakage flux, can be avoided. Also, by adopting the present embodiment, it becomes unnecessary to make the electromagnet larger, increase the number of turns of the coil or flow an overcurrent to obtain a magnetic flux of necessary intensity and thus, the magneto-optical information recording apparatus can be made compact and lower power consumption can be realized. Also, the leakage flux as mentioned above may induce electromagnetic dielectric in the surrounding electronic parts and noise may be produced in the signal line. Particularly, the objective driving means is susceptible to the influence because it uses an electromagnetic force and moreover is positioned near the bias magnetic field producing means. The present embodiment decreases the leakage flux and is therefore effective to prevent such an inconvenience as well.

Figure 3:
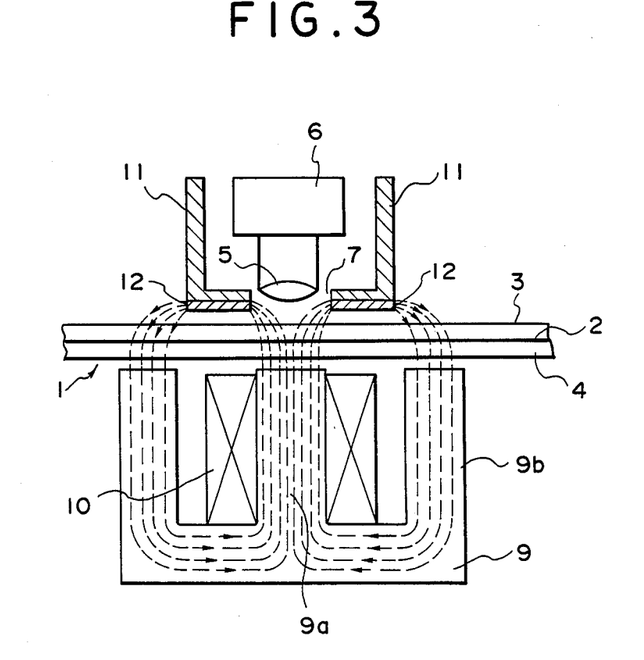
FIG. 3 is a side cross-sectional view schematically showing the construction of another embodiment of the magneto-optical information recording apparatus of the present invention.

FIG. 3 is a side cross-sectional view showing another embodiment of the present invention. In FIG. 3, members similar to those in FIG. 2 are given similar reference numerals and need not be described in detail. In this embodiment, the protective outer frame comprises a frame member 11 formed of a non-magnetic material such as plastics and a ferromagnetic material layer 12 provided on the surface of the frame member 11 which is opposed to the optical disk 1. The ferromagnetic material layer 12 is formed by adhesively securing, for example, a sheet member consisting of a ferromagnetic material, Bonde steel sheet, silicon steel sheet, magnetic steel sheet, or the like to the frame member 11. Alternatively, the ferromagnetic material layer 12 may be provided on the surface of the frame member 11 by evaporation or plating. As compared with the embodiment of FIG. 2, the present embodiment has an advantage that the protective frame member can be made lighter in weight.

In the embodiments shown in FIGS. 2 and 3, to cause a magnetic flux to concentrate more efficiently on the recording portion of the optical disk, it is desirable that the protective frame member, etc. be constructed so as to satisfy predetermined conditions. This will hereinafter be described with reference to the schematic view of FIG. 4 which shows the magneto-optical information recording apparatus.

Figure 4:
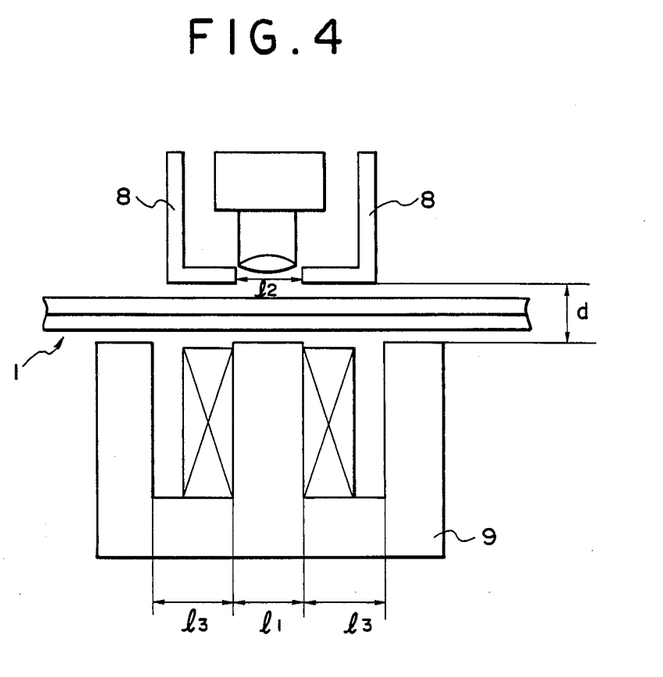
FIG. 4 is a schematic view showing the dimensions of various portions of the magneto-optical information recording apparatus of the present invention.

When as shown in FIG. 4, the width of the yoke 9 is $l_1$ and the spacing of each gap of the yoke 9 is $l_3$ and the width of the opening in the protective outer frame 8 is $l_2$ and the distance between the yoke 9 and the protective outer frame 8 is d, it is desirable that the following conditions be satisfied:

$$l_3/d > 1 \tag{1}$$

$$l_2/l_1 < 1 \tag{2}$$

Formula (1) above means that the spacing of the gap is greater than the distance between the yoke and the protective outer frame. If the condition of formula (1) is departed from, the magnetic line of force passing from the central protruding portion of the yoke through the air directly into the opposite protruding portions of the yoke will increase and it will be difficult for the magnetic flux density of the recording portion to become high. Also, formula (2) means that the width of the yoke is greater than the width of the opening in the protective outer frame. If the condition of formula (2) is satisfied, the end of the protective outer frame will become opposed to the protruding portion of the yoke 9 with the optical disk 1 interposed therebetween, and it will become easy for the magnetic flux in the vertical direction to concentrate on the recording portion of the optical disk 1.

The present invention is not restricted to the above-described embodiment, but other various applications thereof are possible. For example, the magneto-optical recording medium is not limited to the aforedescribed disk-like shape, but may also be of the card-like shape or the tape-like shape. It should be understood that the present invention covers all of such modifications without departing from the scope of the invention as defined in the appended claims.

What we claim is:

1. A magneto-optical information recording apparatus comprising:
    an objective for condensing a light beam on a magneto-optical recording medium;
    bias magnetic field producing means including a yoke provided on the opposite side of said objective with respect to said magneto-optical recording medium for applying a magnetic field from outside to said magneto-optical recording medium near the condensed point of said light beam, said yoke having a central protruding portion disposed at a location opposed to said objective and an outer protruding portion disposed away from said central protruding portion along the surface of the recording medium; and
    a protective outer frame containing said objective therein and having an opening for transmitting said light beam therethrough at a location opposed to said magneto-optical recording medium, at least that portion of said protective outer frame which is opposed to said recording medium being formed of a ferromagnetic material so that said portion of said protective outer frame, said central protruding portion and said outer protruding portion lie in a closed magnetic flux loop.

2. A magneto-optical information recording apparatus according to claim 1, wherein said bias magnetic field producing means has a yoke provided with a gap at a location opposed to said magneto-optical recording medium, and the following formula are satisfied:

$$l_3/d > 1$$

$$l_2/l_1 < 1$$

wherein $l_1$ is the width of said yoke, $l_3$ is the spacing of said gap, $l_2$ is the width of said opening in said protective outer frame, and d is the distance between said yoke and said protective outer frame.

3. A magneto-optical information recording apparatus according to claim 1, wherein the whole of said protective outer frame is formed of a molded ferromagnetic material.

4. A magneto-optical information recording apparatus according to claim 1, wherein said protective outer frame comprises a frame member formed of a non-magnetic material and a ferromagnetic member provided on the surface of said frame member which is opposed to said magneto-optical recording medium.

5. A magneto-optical information recording apparatus according to claim 1, wherein said ferromagnetic material is selected from the group consisting essentially of electromagnetic soft iron, Bonde steel sheet, silicon steel sheet and magnetic steel sheet.

6. A magneto-optical information recording apparatus comprising:
    an objective for condensing a light beam on a magneto-optical recording medium;
    a protective outer frame containing said objective therein and having an opening for transmitting said light beam therethough at a location opposed to said magneto-optical recording medium, at least a portion of said protective outer frame being formed of a ferromagnetic material; and
    bias magnetic field producing means provided on the opposite side of said objective with respect to said magneto-optical recording medium for applying a magnetic field from outside to said magneto-optical recording medium near the condensed point of said light beam, said bias magnetic field producing means having a yoke provided with a gap at a location opposed to said magneto-optical recording medium, and satisfying the following formulas:

$$l_3/d > 1$$

$$l_2/l_1 < 1$$

wherein $l_1$ is the width of the said yoke, $l_3$ is the spacing of said gap, $l_2$ is the width of said opening in said protective outer frame, and d is the distance between said yoke and said protective outer frame.

7. A magneto-optical information a recording apparatus according to claim 6, wherein the whole of said protective outer frame is formed of moled ferromagnetic material.

8. A magneto-optical information recording apparatus according to claim 6, wherein said protective outer frame comprises a frame member formed of a non-magnetic material and a ferromagnetic member provided on the surface of said frame member which is opposed to said magneto-optical recording medium.

9. A magneto-optical information recording apparatus according to claim 6, wherein said ferromagnetic material is selected from the group consisting essentially of electromagnetic soft iron, Bonde steel sheet, silicon steel sheet and magnetic steel sheet.

10. A magneto-optical information recording apparatus comprising:

an objective for condensing a light beam on a magneto-optical recording medium;

bias magnetic field producing means provided on the opposite side of said objective with respect to said magneto-optical recording medium for applying a magnetic field from outside to said magneto-optical recording medium near the condensed point of said light beam; and a protective outer frame containing said objective therein and having an opening for transmitting said light beam therethrough at a location opposed to said magneto-optical recording medium, said protective outer frame comprising a frame member formed of a non-magnetic material and a ferromagnetic member provided on the surface of said frame member which is opposed to said magneto-optical recording medium.

11. A magneto-optical information recording apparatus according to claim 10, wherein said ferromagnetic material is selected from the group consisting essentially of electromagnetic soft iron, Bonde steel sheet, silicon steel sheet and magnetic steel sheet.

* * * * *

UNITED STATES PATENT AND TRADEMARK OFFICE
CERTIFICATE OF CORRECTION

PATENT NO. : 4,843,600
DATED : June 27, 1989
INVENTOR(S) : YOSHIKAZU MIYAJIMA, ET AL.   Page 1 of 2

It is certified that error appears in the above-identified patent and that said Letters Patent is hereby corrected as shown below:

ON THE TITLE PAGE,
AFTER ITEM [22] AND BEFORE ITEM [51]

Insert --[30] Foreign Application Priority Data

September 13, 1985  [JP] Japan ...... 60-201781
           August 27, 1986     [JP] Japan ...... 61-200532--.

IN [56] REFERENCES CITED

FOREIGN PATENT DOCUMENTS,
        "0115666  6/1984  European Pat. Off. ." should
        read --0115666  8/1984  European Pat. Off.--;
        "60-29904  5/1985  Japan" should read
        --60-29904  2/1985  Japan--; "61-32244  11/1986
        Japan" should read --61-32244  2/1986  Japan--.

UNITED STATES PATENT AND TRADEMARK OFFICE
CERTIFICATE OF CORRECTION

PATENT NO. : 4,843,600

DATED : June 27, 1989

INVENTOR(S) : YOSHIKAZU MIYAJIMA, ET AL.  Page 2 of 2

It is certified that error appears in the above-identified patent and that said Letters Patent is hereby corrected as shown below:

COLUMN 6

Line 5, "formula" should read --formulas--.
Line 10, "$l_1$is" should read --$l_1$ is--.
Line 59, "a" should be deleted.
Line 61, "moled" should read --molded--.

Signed and Sealed this

Twenty-ninth Day of May, 1990

Attest:

HARRY F. MANBECK, JR.

*Attesting Officer*  *Commissioner of Patents and Trademarks*